US010657190B2

(12) United States Patent
Melik et al.

(10) Patent No.: US 10,657,190 B2
(45) Date of Patent: May 19, 2020

(54) SYSTEM AND METHODS FOR CLOUD BASED AUTONOMOUS AND COLLABORATIVE AUTHORING

(71) Applicant: PLANBOX INC., Laval (CA)

(72) Inventors: Rudolf Melik, Laval (CA); Karell Ste-Marie, Brownsburg-Chatham (CA)

(73) Assignee: PLANBOX INC. (CA)

( * ) Notice: Subject to any disclaimer, the term of this patent is extended or adjusted under 35 U.S.C. 154(b) by 224 days.

(21) Appl. No.: 15/946,322

(22) Filed: Apr. 5, 2018

(65) Prior Publication Data

US 2018/0293320 A1 Oct. 11, 2018

Related U.S. Application Data

(60) Provisional application No. 62/481,759, filed on Apr. 5, 2017.

(51) Int. Cl.
| | |
|---|---|
| *G06F 16/9535* | (2019.01) |
| *G06F 16/21* | (2019.01) |
| *G06F 16/2457* | (2019.01) |
| *G06Q 10/10* | (2012.01) |
| *G06F 16/9537* | (2019.01) |
| *G06F 16/335* | (2019.01) |
| *H04L 29/08* | (2006.01) |

(52) U.S. Cl.
CPC ........ *G06F 16/9535* (2019.01); *G06F 16/219* (2019.01); *G06F 16/24575* (2019.01); *G06F 16/24578* (2019.01); *G06F 16/335* (2019.01); *G06F 16/9537* (2019.01); *G06Q 10/101* (2013.01); *H04L 67/10* (2013.01)

(58) Field of Classification Search
CPC ..... G06F 16/33; G06F 17/276; G06F 16/9535
See application file for complete search history.

(56) References Cited

U.S. PATENT DOCUMENTS

| | | | | |
|---|---|---|---|---|
| 5,873,107 | A * | 2/1999 | Borovoy | ............... G06F 17/276 |
| | | | | 715/234 |
| 2017/0255627 | A1* | 9/2017 | Coll | ........................ G06F 16/33 |

\* cited by examiner

*Primary Examiner* — Etienne P Leroux
(74) *Attorney, Agent, or Firm* — Lavery, De Billy, LLP; Hugh Mansfield

(57) ABSTRACT

An autonomous intention, article search and actionable data generation system and method to query public or private as well as internal and external data sources that are available to an organization, tapping into all information in real-time and on an ongoing basis to make recommendations to take at least one action or to autonomously filter, find, identify, connect, merge, support, evaluate, select, and approve intentions and/or articles for a given search context, an instance context (such as one of a challenge, theme, topic, goal, objective, mission, target, focus area, problem, risk, or the like), and an organizational context (such as an industry, line of business, strategy, goals, objectives, areas of expertise, and the like). The system may also take into account a participant's past actions in similar situations, a participant's background, diversity and inclusion attributes, skills, interests, experience, location, and other participant attributes.

20 Claims, 10 Drawing Sheets

SYSTEM AND METHODS FOR CLOUD BASED AUTONOMOUS AND COLLABORATIVE AUTHORING

CROSS-REFERENCE TO RELATED APPLICATIONS

This application claims priority under 35 USC § 119(e) of U.S. provisional application Ser. No. 62/481,759 filed on Apr. 5, 2017. All documents above are incorporated herein in their entirety by reference.

FIELD OF THE INVENTION

The present relates to a system and method for cloud based autonomous and collaborative authoring.

BACKGROUND TO THE INVENTION

Innovation involves lots of deliberation, actions, reactions, conversations, collaboration as well as checks and balances. Currently ideas, challenges, issues, concepts, decisions, elections, opportunities, risks, and suggestions (collectively referred to as Intentions) are manually created and entered by a participant. Voting, commenting, selecting, evaluating and approving such intentions is also a manual action participants must take either collectively or as individuals.

Collaborative sourcing initiatives that start with a blank canvas are typically an uphill battle from the get-go despite an abundance of information and proliferation of easily accessible public and private data sources which results in a "data starved" launch. Participants have very little to work with other than the initial content provided by, for example, the program team and initiative owner. This lack of relevant content and early activity has an impact on participation. The massive rate of transformation in a globally connected world further exasperates the ability to locate, select and update information related to ideas, suggestions, issues, opportunities, risks, proposals and decisions.

Additional challenges facing a standard collaborative sourcing initiative include, for example that: participants are too busy with meeting everyday deliverables to find and submit new intentions or find supporting articles related to an intention; developing intentions requires extensive manual research to ensure the right data points and supporting material are collected; participants struggle to have meaningful interactions and connections to help contribute and achieve the right outcomes; stakeholders have difficulty identifying high value intentions or opportunities and developing actionable solutions to complex problems; challenge owners have to constantly following with participants to vote, comment on and support the ideas believe have potential—even for the simplest decisions; and innovation program managers have to constantly ask reviewers, subject matter experts and managers to evaluate, reject and approve—even for the simplest decisions.

SUMMARY OF THE INVENTION

In order to address the above and other drawbacks and challenges there is provided an autonomous intention, article search and actionable data generation system to query public or private as well as internal and external data sources that are available to an organization, tapping into all information in real-time and on an ongoing basis to filter, find, identify, connect, merge, support, evaluate, select, and approve intentions and/or articles for a given search context, an instance context (such as one of a challenge, theme, topic, goal, objective, mission, target, focus area, problem, risk, or the like), and an organizational context (such as an industry, line of business, strategy, goals, objectives, areas of expertise, and the like). The system may also take into account a participant's past actions in similar situations, a participant's background, diversity and inclusion attributes, skills, interests, experience, location, and other participant attributes.

There is also provided a system allowing organizations to for example automatically create, merge, update and assemble intentions and articles by searching for relevant information in private and public content sources the organization has access to that match the search context, instance context and organizational Contexts. The system may be configured for example to filter content by language, profanity, and take a content's "sentiment" into account in the filtering process. Data source types may include but are not limited to: social network content such as Facebook and Twitter public and private feeds; business networking content such as LinkedIn and Facebook public and private groups; RSS feeds and other streamed searchable content; Customer Relationship Management (CRM) System leads, opportunities, chats, and comments; chat and collaboration applications such as Yammer, Jive, Slack, Hipchat, Skype, and Office 365; document storage and management systems such as Google Drive, Dropbox, Box.com, Amazon Drive, SharePoint, and Microsoft OneDrive; secure filtering and import of matching email threads and discussions from a set of target email accounts or email groups; patent databases such as at the United States Patent and Trademark Office (USPTO), the Canadian Intellectual Property Office (CIPO), and other jurisdictions.

There is additionally provided a cloud based system for supporting a plurality of participants in an organisation in autonomous and collaborative authoring using a content retrieved from a plurality of on-line data sources accessible via a network. The system comprises a web portal for providing each of the participants remote access and via which at least one of the participants establishes an organizational context of the organization, at least one instance context and at least one autonomous intention comprising a plurality of articles and via which each of the participants may provide participant input in respect to the at least one autonomous intention wherein each of the organizational context, the instance context and the autonomous intention comprises a term set comprising a plurality of terms and weights, an Article and Intention Generation (AIG) engine comprising a term set compiler for deriving an aggregate term set from each of the organizational context term set, the instance context term set and the autonomous intention term set, the aggregate term set comprising a plurality of aggregate terms and corresponding weights, and a query builder for generating at least one query from the plurality of aggregate terms and corresponding weights, a content retrieval engine for retrieving the content from the plurality of on-line data sources matching the at least one query wherein the retrieved content is ranked according to a ranking method, and a repository for storing the retrieved content and a history of each participant's inputs. The AIG engine autonomously takes action by at least one of autonomously voting, autonomously commenting and autonomously taking another defined action for each of the participants, the action determined based on the participant inputs, the history, the organizational context, the instant context and the retrieved content.

Furthermore, there is provided a method for supporting a plurality of participants in an organisation in autonomous and collaborative authoring using a content retrieved from a plurality of on-line data sources accessible via a network. The method comprises each of the participants remote accessing a web portal wherein at least one of the participants establishes an organizational context of the organization, at least one instance context and at least one autonomous intention comprising a plurality of articles, each of the participants providing from time to time participant input in respect to the at least one autonomous intention comprising at least one of a vote, an action, a comment, a recommendation or combinations thereof wherein each of the organizational context, the instance context and the autonomous intention comprises a term set comprising a plurality of terms and weights, deriving an aggregate term set from each of the organizational context term set, the instance context term set and the autonomous intention term set, the aggregate term set comprising a plurality of aggregate terms and corresponding weights, generating at least one information stream query from the plurality of aggregate terms and corresponding weights, retrieving the content from the plurality of on-line data sources matching the at least one information stream query, storing the retrieved content and a history of each participant's inputs in a repository, and autonomously taking action where a participant has failed to provide participant input by at least one of automatically voting, automatically commenting and autonomously taking another defined action for at least one of the participants, the action determined based on the participant inputs, the history, the organizational context, the instant context and the retrieved content.

DETAILED DESCRIPTION OF THE ILLUSTRATIVE EMBODIMENTS

Figure 1:
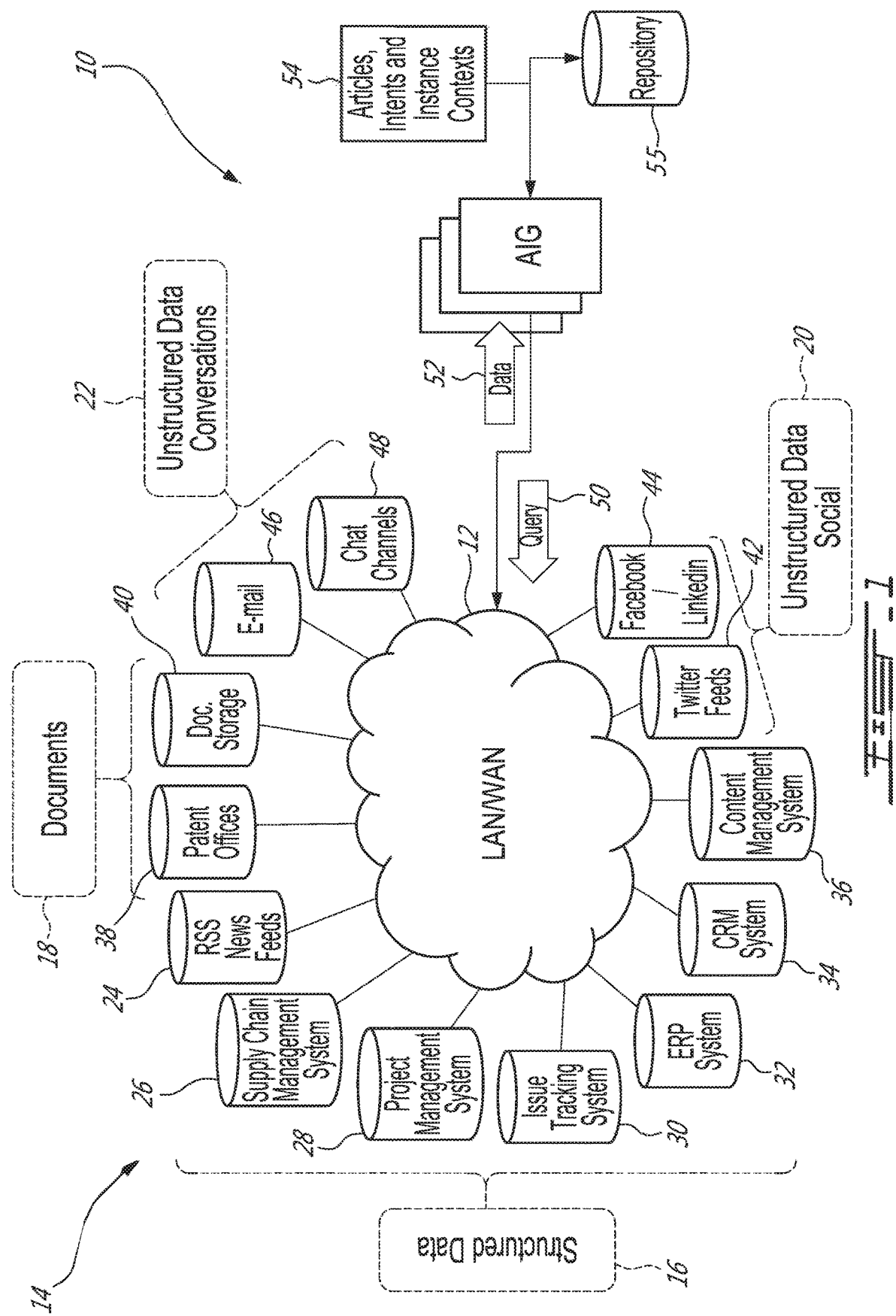
FIG. 1 provides a schematic diagram of a cloud based autonomous and collaborative authoring system and data sources accessible via a wide area networking environment in accordance with an illustrative embodiment of the present invention.

Referring now to FIG. 1, a system and method for cloud based autonomous and collaborative authoring, and generally referred to using the reference numeral 10, will now be described. The system 10 is attached to a data communications network 12, typically a combination of a Local Area Network (LAN) and Wide Area Network (WAN) and to which are also attached a plurality of data sources 14 with which the system 10 communicates. The data sources 14 comprise a plurality of different data types, such as structured data 16, document data 18, unstructured data from social networking 20 and unstructured data from conversations 22. Data sources which provide structured data 16 comprise, for example, RSS news feeds 24, a supply chain management system 26, a project management system 28, an issue tracking system 30, an Enterprise Resource Planning (ERP) system 32, a Client Relationship Management (CRM) system 34 and a content management system 36. Data sources which provide document data 18 comprise, for example, databases 38 at the various patent offices around the world, such as the United States Patent and Trademark Office (USPTO), the World Intellectual Property Organisation (WIPO), the European Patent Office (EPO), the Canadian Intellectual Property Office (CIPO), and the like and document storage systems 40. Unstructured data from social networking 20 comprises, for example, feeds from Twitter 42, and Facebook and LinkedIn 44. Unstructured data from conversations 22 comprises, for example, e-mail 46 and chat channels 48 and the like.

Still referring to FIG. 1, the system 10 accesses the data sources 14 via queries 50 in response to which the system 10 receives data 52. As will be discussed in more detail below, the data 52 is used to generate articles, intents and instance contexts 54 which are stored in a repository 55.

Figure 2:
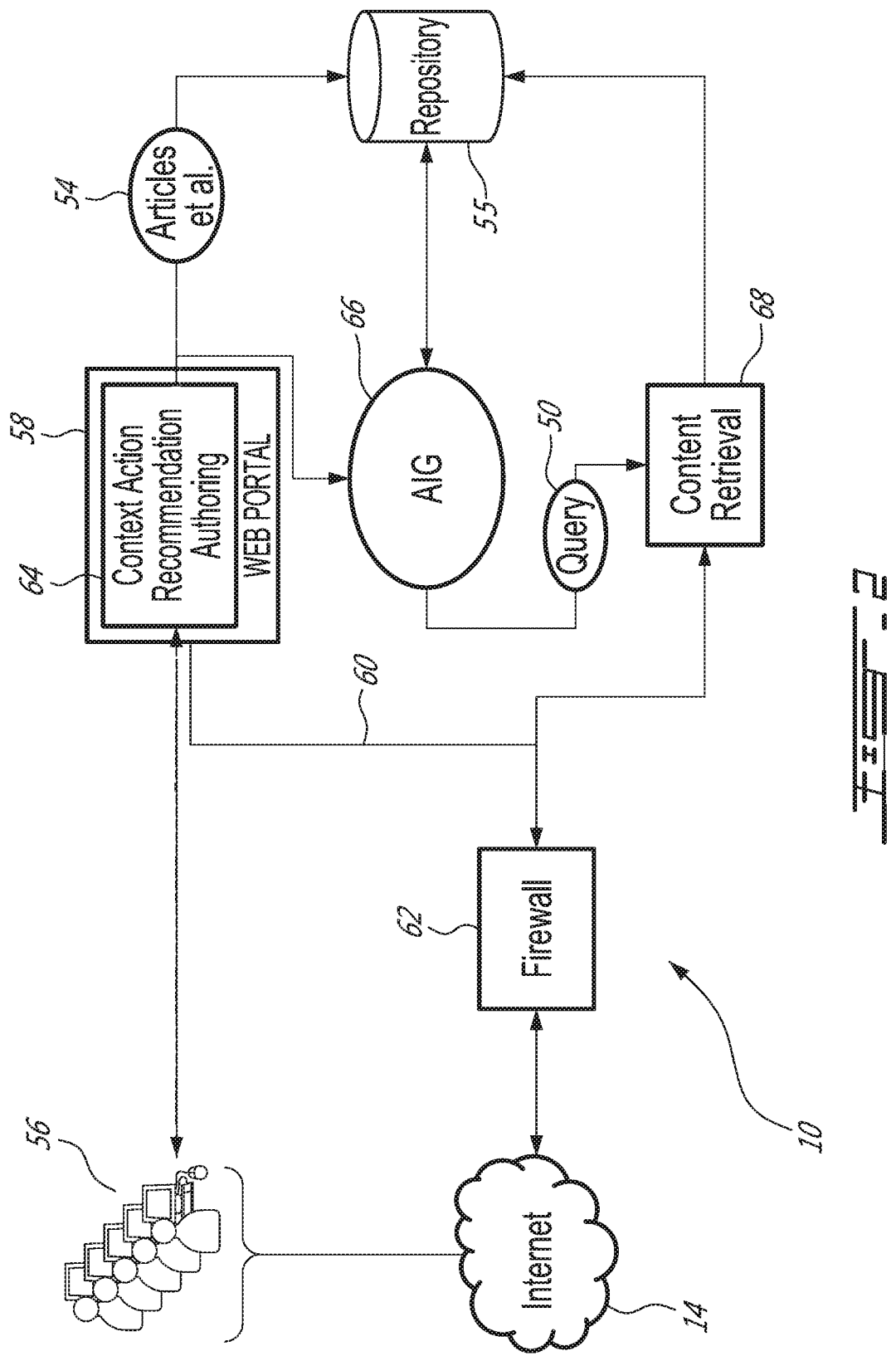
FIG. 2 provides a block diagram of a cloud based autonomous and collaborative authoring system in accordance with an illustrative embodiment of the present invention.

Referring now to FIG. 2, in an illustrative embodiment participants 56 access the system via a WAN 12 such as the Internet and a web portal 58 which is typically on a LAN 60 located behind a firewall 62. Participants 56 provide input 64 to establish the initial parameters for any autonomous intention and article query and generation activity. The participants may also provide other inputs such as articles and the like 54 which are then stored in the repository 55. Participant input 64 received via the web portal 58 can comprise not only context, but also actions taken, voting, recommendations and authoring. Participant input 64 is used initially by the Article and Intention Generation engine (AIG) 66 to generate one or more queries 50 and to store participant's action in case of a vote, comment, status change or decision on an intention which are used by the content retrieval engine 68 to retrieve pertinent data for eventual storage in the repository 55.

Figure 3:
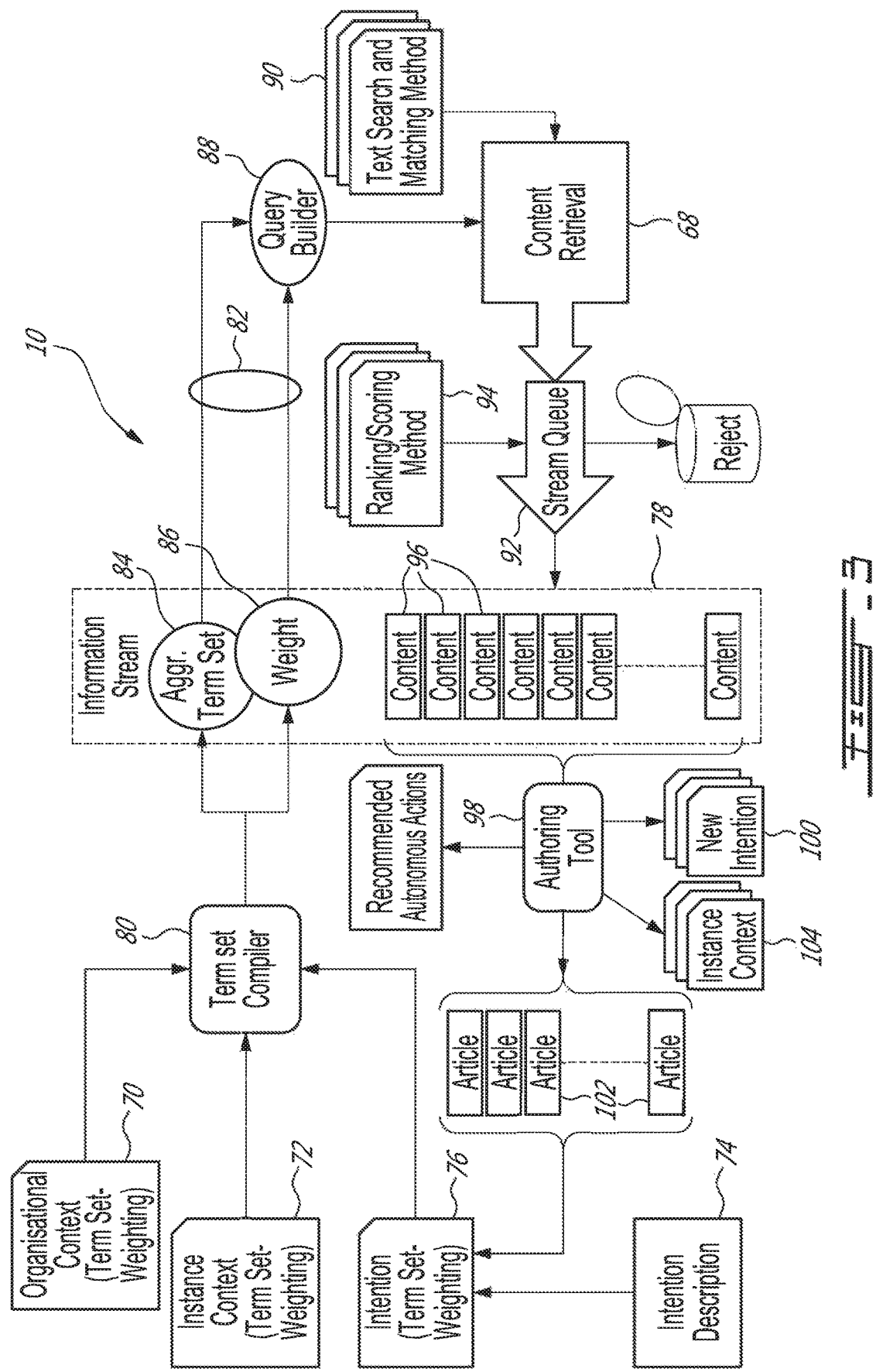
FIG. 3 provides an architecture of a cloud based autonomous and collaborative authoring system in accordance with an illustrative embodiment of the present invention.

Referring now to FIG. 3 in addition to FIG. 2, participant inputs 64 are used to determine an organizational context 70 and an instance context 72. Participant inputs 64 may also include an intention description 74 which provides an intention context 76. The organizational context 70 comprises a term set derived from the industries, topics, and goals that describe the organization's competitive space, business goals and strategic objectives. The instance context 72 consists of the goals that the challenge is focused on, topics and comprises a term set that describes what the particular instance context relates to. The intention's context 78 is in the form of a term set illustratively derived from all of the text that describes what the intention relates to, typically including (but not limited to) its title, description, and all texts of all articles that have been associated to the intention. Of note is that an intention context will only be present if an information stream 78 is being created for a specific intention.

Still referring to FIG. 3, the organizational context 70 term set, instance context 72 term set and intention 76 (if applicable) term set and their associated weights are provided to a term set compiler 80 for examination. The term set compiler 80 derives those terms which are most relevant to the search, generating an information stream term set 82 which comprises an aggregate term set 84 and associated weightings 86. The aggregate term set 84 and associated weightings 86 are used by a query builder 88 to generate construct an information stream query (ISQ). In a particular embodiment a participant may be requested to review and edit the ISQ to optimize the search that will be performed.

In a particular embodiment, the ISQ is constructed and the information stream search is conducted according to the following:

1. The organizational context 70 term set is first added to the information stream term set and its configured weighting (as will be discussed in more detail below) is applied for terms related to this context. Of note is that the information stream can be configured to completely ignore the organizational context 70, include the organizational context 70 term set in full or take into account certain components of the organizational context 70 such as specific industries, topics and/or goals. Term sets that apply from this context are combined with the information stream term set 82, and the context's configured weighting is applied to all applicable terms.
2. The instance context 72 term set which may include the term sets of any goals associated to the instance context 72 is combined with the information stream term set 82, and its configured weighting is applied to all applicable terms.
3. The intention 76 term set (if the information stream is being created for an intention) is combined with the information stream term set 82, and its configured weighting is applied to all applicable terms.
4. The information stream 78 is then created in the system and is associated with the ISQ. In this regard, configured ISQ can include selected information sources set globally and/or the configured ISQ can include information sources set at the ISQ level (local information sources such as a search specific RSS feed).

Still referring to FIG. 3, the information stream term set 82 and ISQ, are provided to the content retrieval engine 68 and a search is performed against the public and private data sources 14 (i.e. the public and private data sources the organization has access to) based on at least one of a plurality of different text search and matching methods 90. The content retrieval engine 68 searches for the content which best matches the ISQ based on the text search and matching method(s) selected. Every entry returned by from the data sources 14 system is treated as a content piece/document. Each document that is returned as a possible match as a result of the query is placed in a stream queue 92 and subsequently analyzed according to one or more ranking and scoring methods 94 as follows:

1. Content in the stream queue 92 to be considered is ranked using one of the text search and matching methods 90 and as will be described in more detail below. Top ranked content with terms matching the ISQ are then subject to the following:
    i. Every term's relevancy score and equivalency weighting obtained from the term set is multiplied by the term's "match term sets" score.
    ii. The document's total ranking score is determined by sum total of all terms scored in 1 above.
    iii. The score of every content piece is the sum total of all term scores. Content with the highest score in a specified set (which can be a date interval or a set of documents that are provided by an information source) are used in descending order (highest scoring content first) to select which content pieces result in stream entries.
2. The documents that earn the highest rankings are returned as stream entry candidates. The system then determines how many of the top ranked documents it will transform into a stream entry based on how the information stream query was set up and how many entries were requested. Other factors that are taken into account for scoring a stream entry candidate:
    i. Profanity: according to a configurable setting whether the system is to ignore content that contains profanity or filters out any such words and processes the remainder of the content.
    ii. Sentiment: the system can be configured to find and match content with only positive, neutral, negative or any combination of the above mentioned sentiments. If this option is enabled, content that does not match the sentiment criteria is not considered.
    iii. Language: whether the system is configured to find English only content, consider or omit any content that has content in other languages.
3. In a particular embodiment the system is configured to continuously search and monitor all registered public and private data sources that are to be used by an information stream, searching for and retrieving content that matches the search criteria identified in any ISQ as described above. If a match is found that fits the minimum search criteria then a new information stream entry is created, and the content and its score with respect to the search criteria is saved in the system.
    i. At set intervals (time or event if pull) or arrival of new data (push) the draft stream entries are inserted into the stream queue 92.
    ii. Based on the relevancy score of the draft stream entry the system makes an action decision whether to add the draft stream entry as content 96 to the information stream 78.
    iii. The information stream 78 processes content until its configured end rules are triggered to stop after a certain time, Stream Entry creation count and other rules.

Based on the rules and criteria defined when an information stream 78 is created, an authoring tool 98 transforms the matching content/documents 96 recovered by the search engine 68 into new intentions 100 or into articles 102 that are linked to a specified instance context 72 or intention 76. In an illustrative embodiment this transformation is carried out as follows:

1. If no automated intention/article creation rules are available, then no intention or article is created. New stream entries continue to be added to the information stream until the information stream's end rule is triggered (for example reaching a specified end date or reaching a threshold number of stream entries).

i. in this case, a participant can illustratively create an intention or instance context by selecting one or more stream entries or create articles out of stream entries and link such articles to an existing instance context or intention. Of note is that a stream entry has a one to one relationship with an article
2. Autonomous transformation of content/documents 96 into articles 102:
    i. The authoring tool 98 can be configured to create a limited number of articles for stream entries it finds in a given time interval; for example: find a maximum of five (5) articles per day, per week, or per month for a given intention or instance context. Of note is that these parameters are configurable.
    ii. The authoring tool 98 can be configured to retrieve content 96 published within a date range.
    iii. The authoring tool 98 can be configured for an instant surge of article creation. In this mode, the authoring tool 98 will retrieve content and publish a number of articles in a specified span of time; for example, search for content in the last 6 months and create 10 articles from the top 10 best matching results. Of note is that all of these parameters are configurable. Also of note is that a stream entry has a one to one relationship with an Article
3. Autonomous transformation of content/documents 96 into intentions 76 or instance contexts 104.
    i. An information stream 78 can be configured to automatically create intentions 100 or instance context 104 based on content/stream entries 96 it finds/creates in a given date range (or other criteria). An information stream 78 can auto create intentions 100 as follows.
    ii. Initial Intention Set: an initial number of intentions or instance context for a given information stream are created and the process then stopped (for example, create ten (10) Intentions based on the best matched content in the last 6 months and then stop). In this mode the time available is divided by the number of intentions (180 days/10=18 days) to provide a date range, and the top five (5) articles in that date range are selected, for example, and used to create an intention based on those five (5) articles. Note, all of these parameters are configurable.
        a. An article 102 is created for every content/stream entry 96 and the article 102 is then linked to the newly created intention 100 or instance context 104.
        b. Scheduled Intention Digests: a limited number of new intentions 100 or instance contexts 104 are created once per a given time interval that provides a summary of the best matching content (i.e. content/stream entries 96 that are linked to newly created articles) in a given date range. For example: an intention digest could be created every three (3) hours (or every day, every week, every month etc.) that includes the most relevant content for that date range, up to a maximum of, for example, ten (10) articles per intention and a maximum of, for example, twenty (20) intentions. Note, all of these parameters are configurable.
        c. Autonomous Intention Surge: a limited number of new intentions 100 are created for a given time interval, even if intentions were auto-created before. For example: create an intention digest every three (3) hours (or per day, per week, per month etc.) that includes the most relevant articles for a given date range, up to a maximum of twenty (20) intentions. Note, all of these parameters are configurable.

The information stream 78 and associated content/stream entries 96 can be viewed and used by a participant or user at any time to create instance contexts 104, intentions 100 or articles 102 from the content/stream entries 96. Articles 102 can also be manually created from content/stream entries 96 and linked to existing intentions 76 or instance contexts 72.

Still referring to FIG. 3, as discussed above the content retrieval engine 68 applies a number of different search and matching methods in order to acquire and analyze relevant texts. These are illustratively based on a vector space model.

To match search terms a term frequency-inverse document frequency (TF-IDF) method is illustratively provided. TF-IDF is a numerical statistic which reflects the importance a word is to a document in a collection or corpus. TF-IDF is used to find and rank the most important terms in any content and to calculate a score for every term. TF-IDF is generally used when the query containing a few words and phrases is performed against a very large number of documents of varying sizes. The documents can be as short as a tweet or as long as several hundred pages long.

A method for matching terms sets comprises a TF-IDF weighted sum with frequency normalization. This method is used when the query input is a document itself that can potentially be several pages (or even tens to hundreds of pages) long, to find the best matched documents.

For spam detection, a Naive Bayes spam filtering method is provided as a quick method of detecting spam in content that is under consideration. The TF-IDF method weighted sum with frequency normalization can also be used to detect terms that appear most often in spam content.

Sentiment analysis is illustratively performed using Python Natural Language Tool Kit (NLTK). A sentiment score is provided that can be used to determine whether the text is positive, negative or neutral as well as subjectivity and polarity scores that are illustratively used to assess and compare sentiments for a given intention, course of action or decision.

Figure 4:
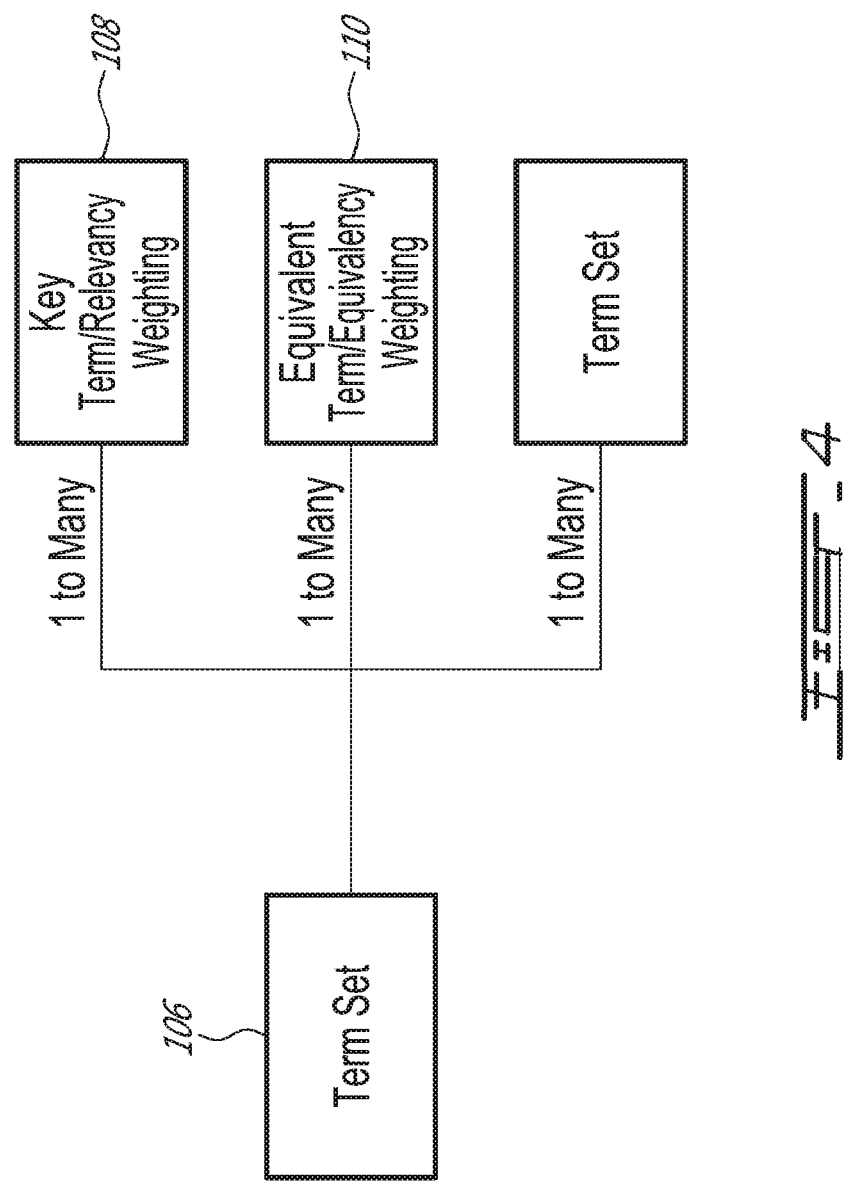
FIG. 4 provides a diagram of term set object relationships in accordance with an illustrative embodiment of the present invention.

Referring now to FIG. 4, term sets 106 store the most important keywords and terms that are used by the system. Term sets 106 can also be used to show a human readable summary of an object (not shown) with which the term set 106 is associated. Term sets 106 are created and linked back to the object that resulted in its creation. This makes the term set 106 efficient when querying and to perform any analysis. A term set 106 has at minimum the following properties: unique identifier, key terms and their relevancy weighting 108, equivalent terms that are similar to the key term with a corresponding equivalency weighting (for example as a percentage) to the term they are equivalent to 110.

Still referring to FIG. 4, the relevancy weighting is set based on where the term appears in its respective object. If the term was found in the primary content (example a term that appeared in an intention's title and summary) then its relevancy weighting is typically 100%. If the content is found in a secondary content (example a term that appeared in an Article linked to Intention—and the Intention's Termset is being generated) then its relevancy weighting might be 10%. Subsequent levels of content illustratively have weighting that is $\frac{1}{10}$ of the level before. Notwithstanding the preceding, relevancy weightings are typically configurable.

Still referring to FIG. 4, a term set's key terms may consist of single words only, or phrases (a set of adjacent words) can also be present in a term set, both as a key term or an equivalent term. On the other hand, words such as conjunctions and the like are typically filtered out. More weight would typically be given to rare words in an article of text.

Figure 5:
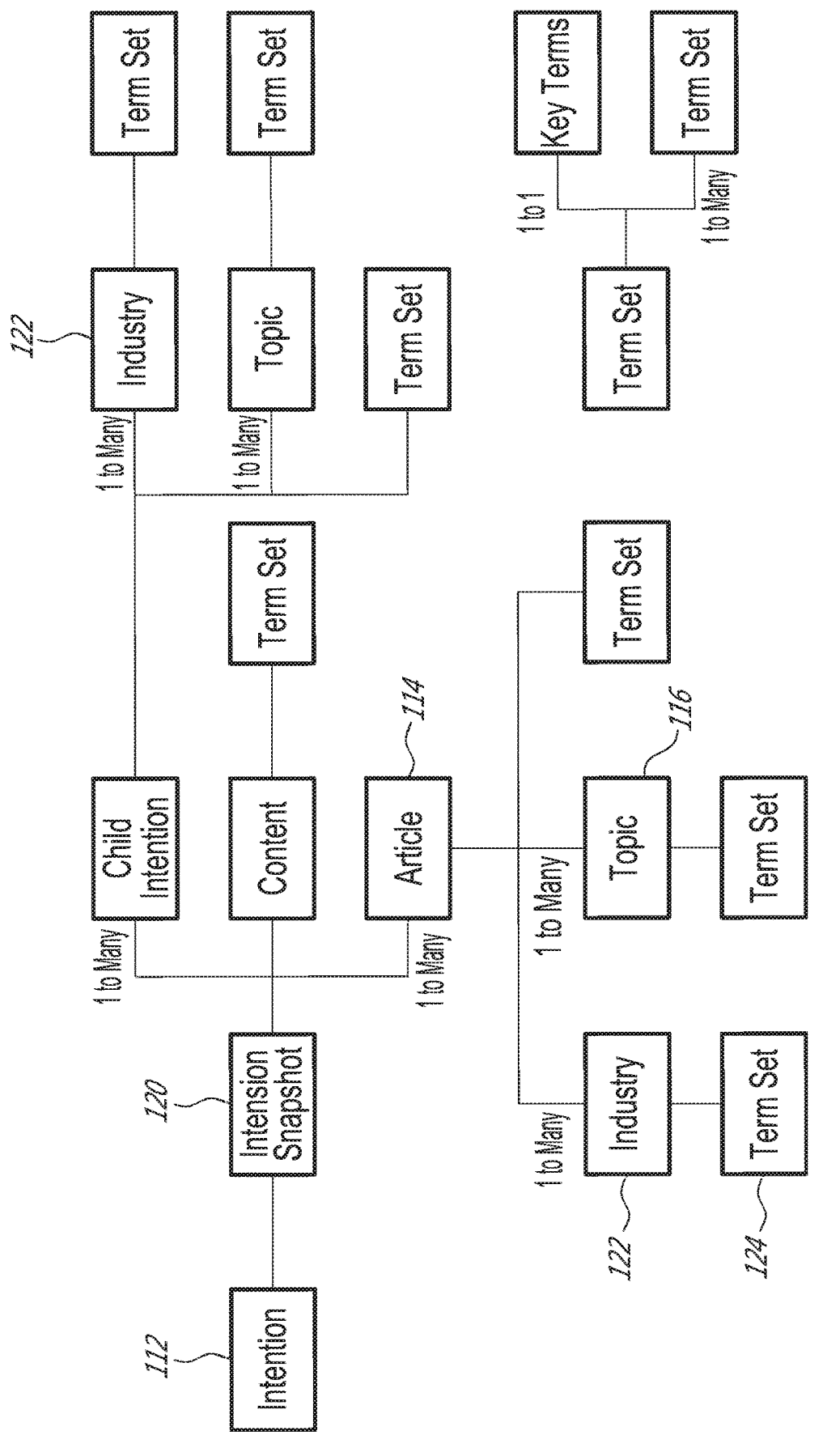
FIG. 5 provides a diagram of intention and article object relationships in accordance with an illustrative embodiment of the present invention.

Referring now to FIG. 5, intention objects 112 and article objects 114 are used throughout the entire system. An intention 112 consists of an object that has at minimum a unique identifier, title, and description. An intention 112 can be the parent of none, one or a plurality of child Intentions. An intention 112 may be related none, one or a plurality of articles 114. An intention 112 may be related to none, one or a plurality of topics 116. An intention is related to one content object 118 that is related to one term set which contains all the keywords, key terms and equivalent terms of the intention, and their weightings. Illustratively an intention object 112 comprises the following elements: title, description, owner, instance context, community, contributors, notes, state, number of views, number of votes, number of comments, sentiment subjectivity high, sentiment subjectivity low, sentiment polarity high, sentiment polarity low, and sentiment score. Every text change (including the main content of the intention 112 as well as all comments made on the intention 112) updates the intention's sentiment scores as defined above.

Still referring to FIG. 5, updates and changes to an intention 112 result in an automatic creation of a new snapshot 120. Examples of changes that trigger the creation of a snapshot 120 include intention content edit, adding or removing an article from an intention 112, changing an intention's 112 collaborators/participants/owners, and an intention state change. A snapshot 120 provides a picture of the exact state of the intention 112 at the time the snapshot 120 was taken. In this regard, every snapshot 120 records the date the snapshot 120 was taken, and references the interaction that caused the snapshot 120 to be taken. The intention snapshot 120 replicates many of the fields in the intention object 112 to capture how the intention 112 appeared and the state it was in at that exact point in time.

Still referring to FIG. 5, an intention's title, summary, and any user-defined fields added to the intention become members of the content section of the intention object. Content may also include the intention's term set object as defined above. The intention's term set is automatically created and stored along with the intention. Any changes to the intention's content will also result in the term set being updated. A discussion of how intention term sets are created is provided below.

Still referring to FIG. 5, an article 114 comprises an object that typically has at minimum the following properties: unique identifier, title, description, source, author, link to a thumbnail image, and a term set. An article 114 is related to none, one or a plurality of industries. An equivalency score determines how relevant the article 114 is to each industry it is related to. An article 114 is related to none, one or a plurality of topics 116. An equivalency score determines how relevant the article is to each topic 116 it is related to. An article is related to one term set that contains a plurality of keywords, phrases and equivalent terms. An article's term set is created and stored along with the article 114. Changes to the article's content will result in the associated term set being updated. A discussion of how article term sets are created is provided below.

Still referring to FIG. 5, an industry 122 comprises of an object that has at minimum the following properties: unique identifier, title, description. An industry 122 is related to one term set. The industry's term set is created and stored along with the industry 122. A term set is maintained for every industry 122. The term set can be updated and modified, for example by participant.

Still referring to FIG. 5, a topic 116 comprises of an object that typically has at minimum the following properties: unique identifier, title, description. A topic 116 is related to one term set. The topic's term set is created and stored along with the topic. A term set is maintained for each topic 116. The term set can be updated and modified, for example by a participant.

Term sets as in 124 are created for all objects that have text content, including organizational context, instance contexts, intentions and articles. The term set creation process is illustratively as follows. Primary content is created by applying one of the methods described above in respect to text search and matching and search terms to find the most important words in the entire text of an object's primary content. For example, an intention's title, description and any user defined text fields for the intention may be considered primary content. All terms discovered by the method and having a score of 100% are added to the term set since these terms appear directly in the object's primary content.

A record of the number of times each term appears in the primary content is also included. As an optional configurable step equivalent terms of those terms found in the primary content can be used to find if any matching terms exist. In this regard a library of equivalent terms is maintained and updated from time to time. Illustratively the term library includes terms that are related to each other and a default equivalent score (for example in percentage) which quantifies the how equivalent the terms are to one another. If matching terms are found in the term library which match, these terms are added as equivalent terms with their equivalency score to the term set. At any time, a participant or user can add other equivalent terms, adjust the equivalency score of any equivalent term, or eliminate any of them when the participant or user believes those terms do not apply.

Text that is associated to objects is considered as secondary, tertiary or lower level content depending on the level of relationship/separation (or indirection) between the content piece and the target object. If the object is not related to any secondary object then no secondary content exists (such as for topics as described above). All secondary, tertiary and lower level content is classified by type and is assigned a configurable weighting to quantify its relevance to the object. For example, articles that are linked to an intention act as secondary content to the intention and illustratively are assigned a weighting of 0.10. The weightings assigned to all levels is configurable.

Term sets of all secondary and lower level content objects are aggregated into the object's term set. All phrases and terms from secondary and lower level content objects are weighted in accordance with system settings to reflect their lower level of importance with respect to the primary content terms.

Any changes in the object primary content updates the term set. Since the system maintains references back to related objects, changes to secondary content also affects the term set. For example, if an article is added to an intention, the intention's term set is modified to include the article's terms. If a given article is subsequently removed, the intention's term set is again modified to remove any terms or score that were contributed by that article.

Figure 6:
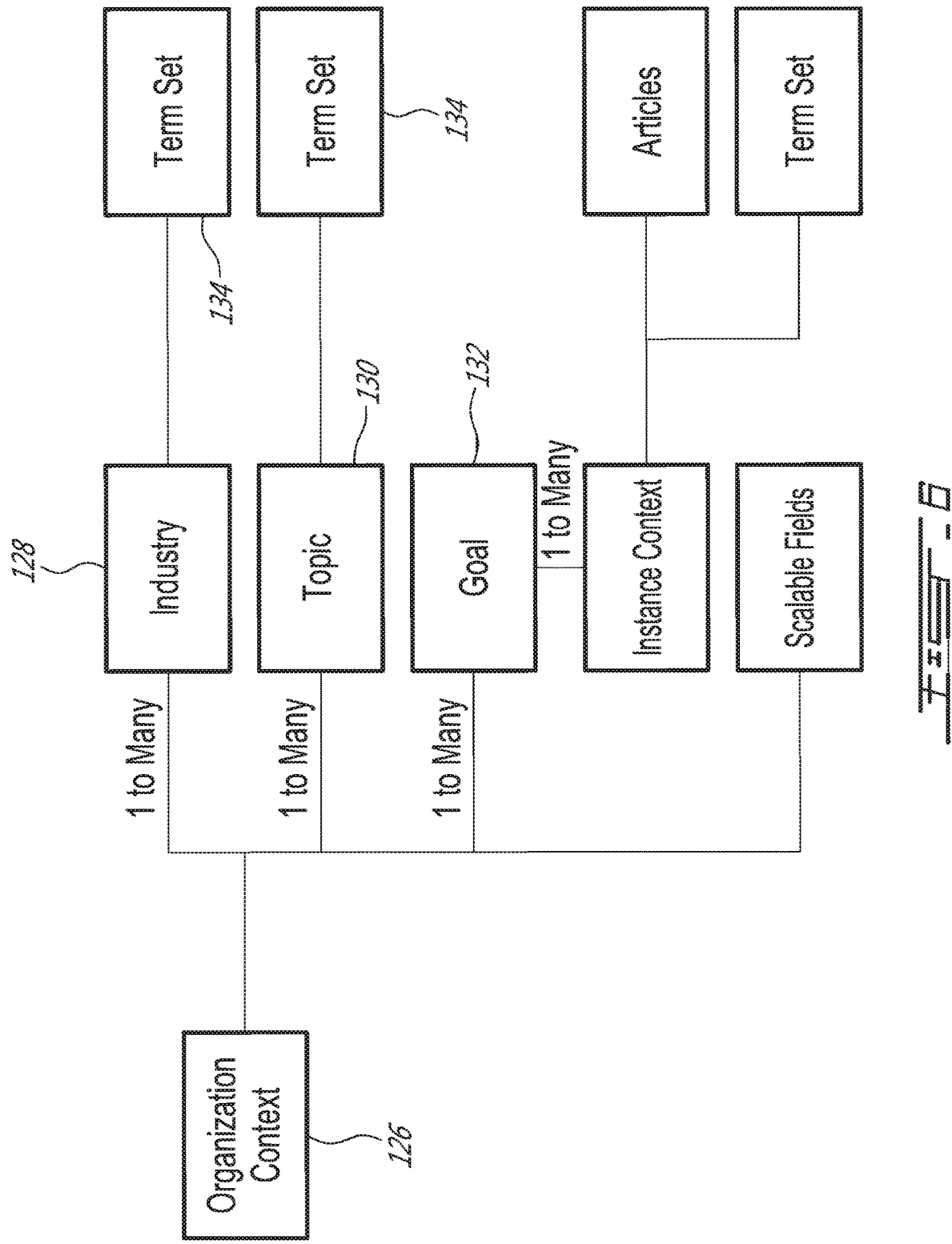
FIG. 6 provides a diagram of organization object relationships in accordance with an illustrative embodiment of the present invention.

Referring now to FIG. 6, the organization context 126 captures the industries/markets 128 the organization 126 participates in (for example using a Standard Industrial Classification (SIC) Code or other industry classifications, or the like, the topics 130 that are most relevant to the organization and which may or not be related to industries 128, goals 132 that describe the organization's strategic objectives, and which are in the form of snapshot objects having a start date and end date. As an organization's business plan and strategy evolves new goal objects 132 are created. Goals 132 remain active until they are archived, completed or their end date is reached. All the above objects are related to their own term set 134 which are created and maintained as described above. The term sets 134 of each of the above objects are updated after any content change in the corresponding object.

An instance context is created when an organization wishes to launch a new initiative, campaign, competition, research program, contest, challenge, group discussion, forum, opportunity review, risk assessment or brainstorming session. The instance context captures text fields such as its title and description, links to one or more organization goals that may have been the motivation for creating the instance context, and links to one or more articles. Participants can browse articles that are linked to an instance context and use one or more of them to create a new Intention or link them to existing intentions. For each instance context a term set is created and maintained as described above. A term set is updated after any content change in the object.

Figure 7:
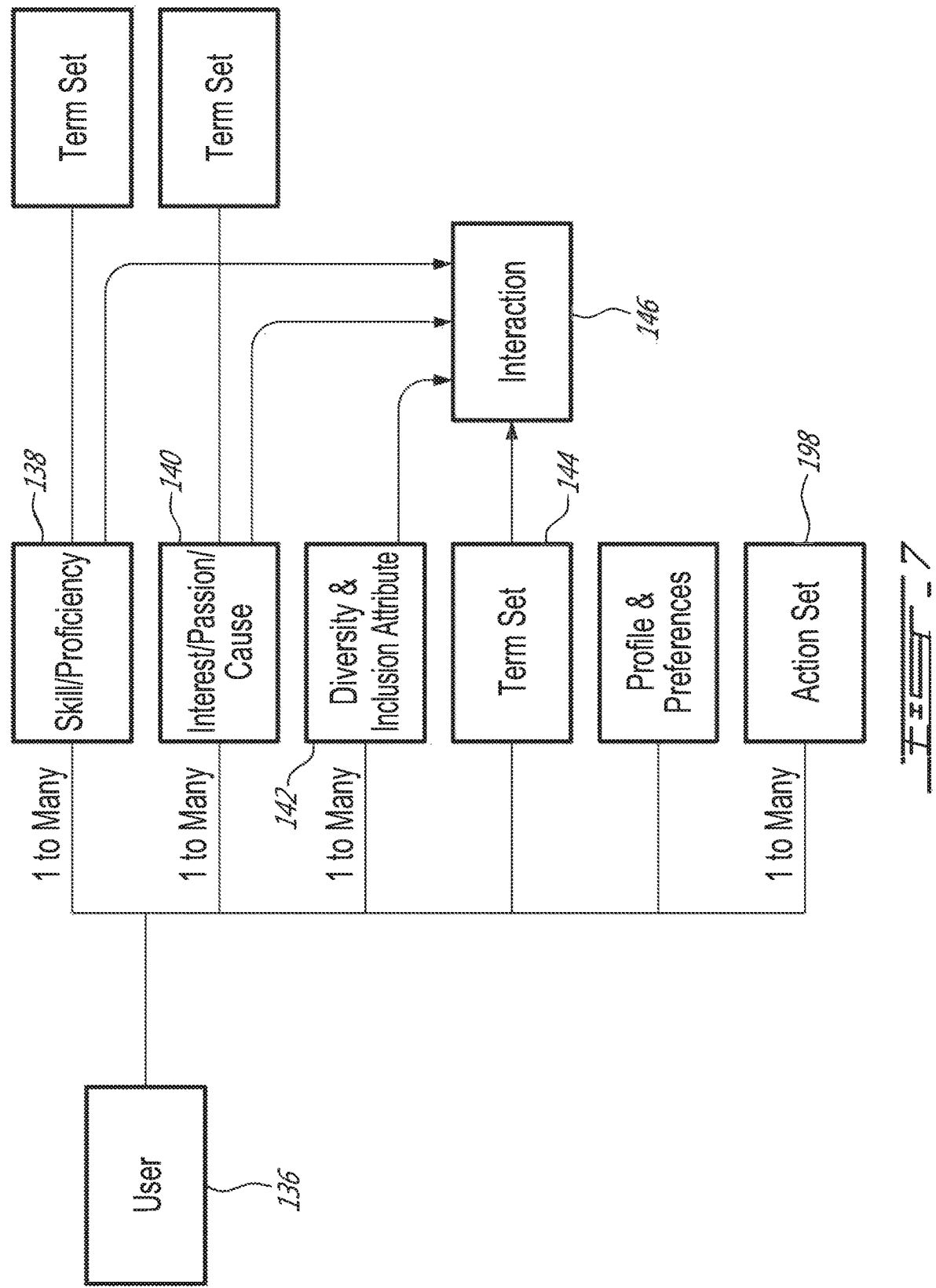
FIG. 7 provides a diagram of user object relationships in accordance with an illustrative embodiment of the present invention.

Referring now to FIG. 7 a user object 136 for every participant. The user object 136 quantifies a number of user related features including, for example: skills/proficiencies 138—every skill has a term set that can optionally be used for behavioral analysis and modeling; 140 interests/passions/causes—every interest/passion/cause has a term set that can optionally be used for behavioral analysis and modeling; date of birth, user type (employee, consultant, customer, general public); hire date (if the user is an employee); diversity and inclusion (D&I) attributes 142; as well current location, the business unit/group the user works for. If the user is a consumer any consumption habits and preferences and other any other user classification attributes user defined fields may also be added to any user of various types (text, list and numerical fields) to capture any user/organization-specific attributes. A term set 144 is created and maintained for the user by the process as described above. A user's skills/interests/passions/causes and any user defined fields that are marked as primary are considered primary content. A user's activity such as voting on and commenting on Intentions results in the aggregation of the terms associated to an intention and related article objects is considered as secondary and tertiary content. As above, every level of content has a configurable weighting that affects the scoring and matching results in the systems prediction and automation activities. The term set is updated after any content change in the object.

While any D&I and other classification information is optional, the more attributes are present, the higher the accuracy of the actions taken on behalf of the user by the system. Simulations also improve when a larger body of data is available for analysis.

Intentions are state-driven objects that follow a workflow process based on business rules that are configured by a participant such as an administrative user and can depend on the organization's policies, a specific user community, an instance context, and other criteria.

Still referring to FIG. 7, an interaction object 146 captures a participant's/user's actions or inaction (whether it was auto-generated, manual or confirmed) when the participant is faced with any type of new information or decision. An interaction is recoded whenever a participant acts. The action can be manual (participant performed), autonomous (system performed) or confirmed (system performed and participant confirmed). Interaction information is then used to predict a participant's future behavior, recommend a set of actions or automatically act on the participant's behalf on other intentions and situations. It should be noted that for the purposes of generating probability scores, the system can be configured to take auto-generated actions into consideration or not. Confirmed and manual actions are always taken into consideration as they are validated by the participant.

Still referring to FIG. 7, an action set 198 object stores all possible actions a participant can take when an intention is in a given state. An action set object is created for every participant and for every intention. This means that 500 intentions and 500 participants results in 250,000 action set objects. The action set object is created or updated for every participant as soon as a new intention is created or changed in any way.

Action sets are snapshot objects that are valid in a given date interval. Any change to an intention will invalidate the current set of actions if the change in the intention implies that the set of actions the participant may take are to change. The date of invalidation is set and the action set is marked as inactive. A new action set is then created for the participant to compute the next set of possible actions and their scores.

An action state change-state ID and action state change-state score pairs track the score for the participant to change the intention's current state to the next possible state. Of note is that the entry is null or the score is zero for a given state if the participant does not have access to change the intention's state. Illustratively, up to 50 next possible states are tracked in the action object. This limit that can be changed by creating more action state change-state ID and action state change-state score pairs.

An action-comment-score and action-comment-pre-canned are used to track the score for the participant making pre-canned comments for a given intention state. Illustratively, up to 50 pre-canned comments are tracked in the action object. This limit that can be changed by creating more comment entry pairs.

An action-defined-#-score is used to track the score for the user to take other pre-defined actions based on the intention's current state. Illustratively up to 50 pre-defined actions are tracked in the action object. This limit can be changed by creating more action-defined-#-score fields.

If a participant undoes an automatic action, its weightings are updated and scoring for that interaction and action set to reflect the change. The lower scoring/weighting will reduce the likelihood of this particular action type for being considered in future similar situations.

If a participant undoes a manual action, its weightings and scoring for that interaction and action set are updated to reflect the change. The lower scoring/weighting reduces the ranking of this particular action type for future similar situations.

Figure 8:
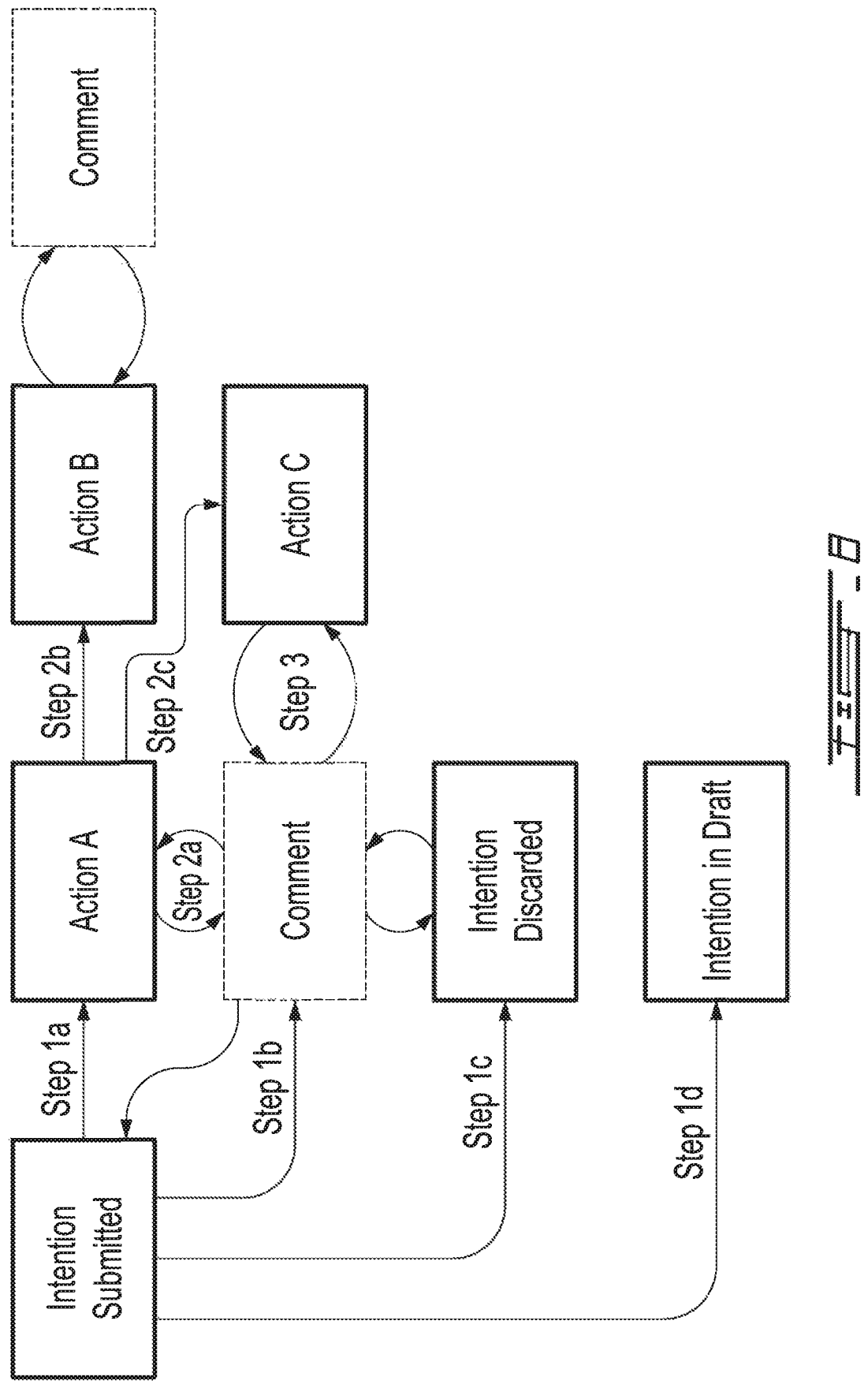
FIG. 8 provides a diagram of an autonomous intention action method in accordance with an illustrative embodiment of the present invention.

Referring now to FIG. 2 and FIG. 8, an Autonomous Intention Action (AIA) 148 taken by the AIG 66 will now be described. In this regard the AIG 665 may operate in one of an autonomous (or self-driving) mode or a recommendation mode. An AIA automatically acts on intentions such as comment on them, discard (opt out), select them on behalf of a participant 56, or take other actions using the Base Action Method (BAM) or the Dynamic Action Method (DAM) both as will be described in more detail below.

Still referring to FIG. 2 and FIG. 8, at a first step following submittal 150 of an intention and in the autonomous mode the AIG 66 use BAM (or DAM if dynamic method is configured) to decide whether to:
1. Vote on an Intention
2. Change the state of an Intention
3. Comment on an Intention and what comment to make 4. Discard (or opt out of) an Intention (or do nothing)
5. Take other actions that are available In the recommendation mode, the AIG engine 66 will provide suggestions to a participant 56 on whether he/she should vote, how to vote, whether to make a state change, what comment to make, or whether the Intention should be discarded by participant intervention. The participant 56 may either accept the recommended action(s), or override the recommendation(s) and take a different action. The AIG engine 66 takes the participant's 56 response to the action into consideration. This information is analyzed and used to improve the next set of actions it recommends or autonomously executes for similar Intentions or a similar situation.

A participant 56 may always reverse an autonomous action taken by the AIG engine 66, if this option has been enabled. In this case, the AIG engine 66 takes the participant's override into consideration and accounts for the action change in future autonomous actions and recommendations. This is described in more detail below.

Still referring to FIG. 2 and FIG. 8, at a second step the AIG engine 66 may automatically comment on the Intention even after taking an action such as supporting the Intention, voting, changing the Intention's state or taking other actions in order to pose follow up questions, to express further opposition to or support for an Intention. An Intention may be automatically moved to a new state if an intention management workflow has been designed to support a state change (such as selecting the Intention for shortlisting/further evaluation) and if the participant 56 has access to the function. The AIG engine 66 may either automatically comment on behalf of the participant 56 or recommend what comments the participant 56 should make, even when the Intention is selected.

Still referring to FIG. 2 and FIG. 8, other actions may be taken on Intention (such as being unselected) which may result in discarding the Intention if that is how the intention workflow and business rules have been configured, and if the participant has access to the discard function. The AIG engine 66 may automatically comment on behalf of the participant 56 or recommend comments the participant 56 might make even when the Intention is unselected.

Still referring to FIG. 2 and FIG. 8, at a third step the AIG engine 66 may automatically comment on the Intention even after an action has been taken on the Intention. In this regard, the AIG engine 66 may automatically comment on behalf of the participant 56 or recommend comments the participant 56 might make even after the Intention has been actioned on.

Referring to FIG. 3 in addition to FIG. 2 and FIG. 8, the AIG engine 66 is illustratively connected to participant profiles. To aid the AIG engine 66 in automatically deciding whether to take action on an Intention (such as support/vote for it) on behalf of a participant 56, the following processing, analysis and data transformations may be performed. Every time a new Intention is created or is changed in any way (content added/edited/removed, state change, etc.):

1. The Intention's Term Set is updated and any terms are scored based on their content level;
2. If the changes to the Intention will result a change in the set of possible actions for one or more users (example if the Intention's state was changed, someone voted for or commented on the Intention) then:
   a. The AIG engine 66 will invalidate all such Action Sets. For example, if a participant 56 just voted on an Intention then an Interaction object is created to record the action the participant 56 has taken. Next, the participant's Action Set for this Intention is updated to reference the Interaction that was created for the vote, and the Action Set that triggered the action is marked as inactive and is invalidated.
   b. A snapshot of the Intention is taken and stored in a new Intention Snapshot object, as needed, that is referenced by all newly created Interaction objects so that the full state of the data is captured that led to the taking of that specific action by the participant 56, whether manual or automatic.
   c. All possible actions every potential participant 56 might take are determined for the Intention that changed, the score computed for every possible action and store the results in a new Action Set object for every participant 56 in that Intention or Instance Context. For example, if the participant 56 just voted, a new Action Set is created for the participant 56 that just voted and the score for voting in the new Action Set is set to zero if the participant 56 cannot take the same action again on that Intention more than once.
   d. The score of every possible action is calculated and stored in the Action Set object for every participant 56 that can collaborate on the Intention or the Instance Context.

The AIG engine 66 iterates through every possible action for all participants 56 and computes that action's score set. This information is stored in the Action Set for every participant.

Figure 9:
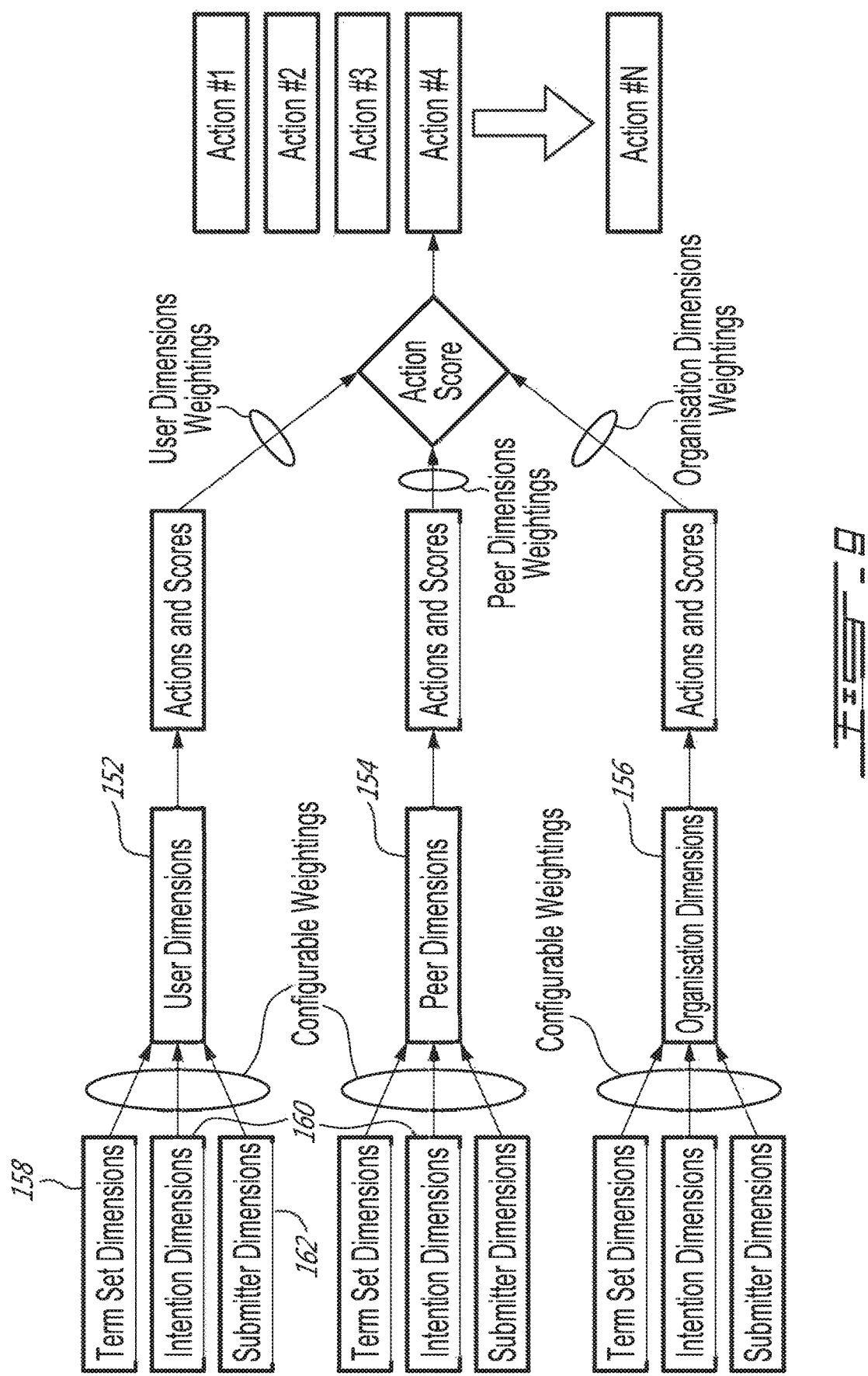
FIG. 9 provides a diagram of an action scoring method in accordance with an illustrative embodiment of the present invention.

Referring to FIG. 9, an action scoring method will now be described. An action's score is computed based on a combination of User dimensions 152, Peer dimensions 154 and Organisation dimensions 156 each comprising Term Set dimensions 158, Intention dimensions 160 and Submitter dimensions 162. This is described in the following.

As discussed above, User Dimensions 152 are comprised of Term Set dimensions 158, Intention dimensions 160 and Submitter dimensions 162.

Term Set Dimensions 158 comprise searches of existing Interactions that indicated the same action by a participant 56 and find any that have matching terms with the terms in the current Intention being analyzed or any of its related content (such as Articles that are linked to the Intention).

1. Terms are matched and scored using one of the methods as described above.
2. Illustratively 1 point is awarded for every matched Interaction with the term appearing in primary content (the Interaction itself including its title and description). The default number of points awarded for a primary content match is configurable.
3. If any Equivalent Terms exist and are matched, 0.10 point multiplied by the Equivalent Term's Equivalency Score is illustratively awarded for every matched Interaction for the Equivalent Term appearing in primary content. The number of points awarded for a primary content match of an Equivalent Term is configurable.
4. 0.05 points are illustratively awarded for every matched Interaction with the term appearing in secondary content (Articles that are related to the Interaction). The number of points awarded for a secondary content match is configurable.
5. The same scoring model as described above for multiple present terms is used in the case of any Article or other content that is related to the Intention being analyzed.
6. A logarithmic function is illustratively applied to the final score to ensure that the resulting score does not dominate other factors being considered. A logarithmic base or other formula which may be used to normalize the score attributed to the Term Set Dimension 158 is configurable. The final score is illustratively referred to as the UserTermSetDimScore.

Intention Dimensions 160 comprises a sum and is illustratively referred to as UserIntentionDimSum. This sum illustratively comprises the following:

1. The number of times the participant 56 has taken the same action on this Instance Context multiplied by the weighting of this dimension (the weighting is configurable);
2. The number of times the participant 56 has taken the same action when an Intention is in the same state as the current Intention being analyzed multiplied by the weighting of this dimension (the weighting is configurable);
3. The number of times the participant 56 has taken the same action on an Intention in the same community as the Intention being analyzed multiplied by the weighting of this dimension (the weighting is configurable);
4. The number of times the participant 56 has taken the same action for any Intention when the sentiment/polarity/subjectivity is within the same sentiment/polarity/subjectivity score range as the current Intention being analyzed multiplied by the weighting of this dimension (the weighting is configurable);
5. The number of times the participant 56 has taken the same action for any Intention that has any other user defined Intention Dimensions that have the same value as the Intention being analyzed multiplied by the weighting of such a dimension (the weighting is configurable);
6. Other dimensions that are configured by the client will be taken into consideration along with their weighting (the weighting is configurable), only the dimensions that the source the participant 56 also possesses are taken into account.

Still referring to FIG. 9, the sum (UserIntentionDimSum) is divided by the number of Intention Dimensions and a logarithmic function illustratively applied to the result to ensure that the resulting score does not dominate other factors being considered. A logarithmic base or other formula which may be used to normalize the score attributed to the Intention Dimensions is configurable. The result of the above computation is illustratively referred to as the UserintentionDimScore.

Still referring to FIG. 9, Submitter Dimensions 162 measure whether and how a submitter's background, profile and Diversity & Inclusion attributes as discussed above might influence the participant's support (vote) for the Intention. A Submitter Dimension 162 illustratively comprises a sum, illustratively referred to as the UserSubmitterDimSum, of the following:

1. The number of times the participant 56 has taken the same action on any Intention when the submitter is male (or female, etc.) multiplied by the configurable weighting of this factor, plus
2. The number of times the participant 56 has taken the same action on any Intention when the submitter has the same Ethnicity as the participant multiplied by the configurable weighting of this factor, plus
3. The number of times the participant 56 has taken the same action on any Intention when the submitter is in the same Department as the participant multiplied by the configurable weighting of this factor, plus
4. The number of times the participant 56 has taken the same action on any Intention when the submitter has any other diversity and inclusion attributes or user defined fields that are available and are configured to be factored into the UserSubmitterDimSum computation and illustratively multiplied by the configurable weighting of such a factor.

Still referring to FIG. 9, all dimensions configured by the client will be used, only the dimensions that the participant 56 being analyzed also possesses are considered for scoring purposes. In this regard, the sum (UserSubmitterDimSum) is divided by the number of Submitter Dimensions and a logarithm base illustratively applied to the result to ensure that the resulting score does not dominate other factors being considered. The logarithmic base and/or formula which is used to calculate the final score attributed to the Submitter Dimensions is configurable. The result of this computation is illustratively referred to as the UserSubmitterDimScore.

Still referring to FIG. 9, the User Dimensions score captures those factors that are computed based on a participant's own specific actions. The User Dimension Score, illustratively referred to as UserDimScore, is then calculated as follows. UserDimScore is equal to:

1. UserTermSetDimScore multiplied by TermSet Dimensions weight, a configurable weighting plus,
2. UserintentionDimScore multiplied by Intention Dimensions weight, a configurable weighting plus,
3. UserSubmitterDimScore multiplied by Submitter Dimensions weight, a configurable weighting Still referring to FIG. 9, the Peer Dimensions 154 also comprise Term Set Dimensions, Intention Dimensions and Submitter Dimensions. These are discussed below.

Term Set Dimensions comprise searches of existing Interactions that indicate the same action taken by any participant with similar profile and/or Diversity and Inclusion attributes to that of the participant being analyzed and find any that have matching terms with the terms in the current Intention or any of its related secondary content (such as Articles that are linked to the Intention). Terms are scored using one of the methods described above. A scoring system per the following is illustratively applied:

1. 1 point is illustratively awarded multiple for every matched Interaction with the term appearing in the primary content (in the Intention itself such as its title and description). The number of points awarded for a primary content match is configurable.
2. If any equivalent terms exist and are matched, 0.10 point is illustratively multiplied by the equivalent term's equivalency score is awarded for every matched Interaction with the term appearing in the primary content. The number of points awarded for a primary content match of an equivalent phrase is configurable.
3. 0.05 point is illustratively awarded for every matched Interaction with the term appearing in secondary content (such as Articles that are related to the Intention). The number of points awarded for a secondary content match is configurable.

The total score based on process above may be calculated as follows. Every attribute can have a weighting to increase or decrease its influence on the sum. These weighted factors for a given attribute are summed when any User Profile (such as Gender) and Diversity & Inclusion attributes are in common between the User and the matched Interactions. This sum is divided by the total number of User Profile (such as Gender) and Diversity & Inclusion attributes that are activated. The final score is illustratively referred to as the PeerTermSetDimScore.

The Intention Dimensions score is the sum of the following dimensions and is illustratively referred to as PeerIntentionDim Sum:

1. The number of times all users with a similar profile and/or Diversity & Inclusion attributes to that of the participant that have taken the same action in this Instance Context multiplied by the weighting of this dimension (the weighting is configurable), plus 2. The number of times all users with a similar profile and/or Diversity & Inclusion attributes to that of the participant have taken the same action when an Intention is in this state multiplied by the weighting of this dimension (the weighting is configurable), plus
3. The number of times all users with a similar profile and/or Diversity & Inclusion attributes to that of the participant have taken the same action on an Intention in this community multiplied by the weighting of this dimension (the weighting is configurable), plus
4. The number of times all users with a similar profile and/or Diversity & Inclusion attributes to that of the participant have taken the same action for any Intention that has any other user defined Intention Dimensions multiplied by the weighting of such a dimension (the weighting is configurable), plus
5. The number of times all users with a similar profile and/or Diversity & Inclusion attributes to that of the participant have taken the same action for any Intention when the sentiment/polarity/subjectivity is within the same sentiment/polarity/subjectivity range as the current Intention being analyzed multiplied by the weighting of this dimension (the weighting is configurable), plus
6. Other dimensions that are configured by the client will be taken into consideration along with their weighting (the weighting is configurable), only the dimensions that the source User also possesses are considered.

This sum (PeerIntentionDimSum) is divided by the number of Intention Dimensions and a logarithmic function or another configured normalizing formula applied to the result to ensure that the resulting score does not dominate other factors being considered. The logarithmic base or other formula used to normalize the score attributed to the Intention Dimensions is configurable. The result of this computation is illustratively referred to as PeerintentionDimScore.

Still referring to FIG. 9, the Organization Dimensions 156 comprise a weighted score (weights are configurable) of all participants 56 in the system, a defined control, or a selected segment of the organization. The selected grouping is independent of any of the attributes of the participants 56 being analyzed. All participants 56 that are part of the same organisation, control group or segment are considered relevant to this dimension regardless of their profile and whether (or not) they have any common attributes with the user being analyzed. Control groups and segments can include external users and consumers depending on the segmentation and diversity information available.

Still referring to FIG. 9, the AIG engine 66 can be configured to compute the Organization Dimensions score based on a different control group and segment for every participant 56. Organization Dimensions 156 also comprise Term Set Dimensions, Intention Dimensions and Submitter Dimensions. These are discussed below.

Term Set Dimensions comprise searches of existing Interactions that indicated the same action by any participant 56 in the organization/control group/segment and find any that have matching terms with the terms in the current Intention being analyzed or any of its related content (such as Articles that are linked to the Intention). Terms are scored using one of the methods described above. Illustratively the following scoring scheme is applied:
1. 1 point is awarded for every matched Interaction with the term appearing in primary content (the Interaction itself including its title and description). Note the default number of points awarded for a primary content match is configurable.
2. If any Equivalent Terms exist and are matched, 0.10 point multiplied by the Equivalent Term's Equivalency Score is awarded for every matched Interaction for the Equivalent Term appearing in primary content. Note the number of points awarded for a primary content match of an Equivalent Term is configurable.
3. 0.05 points are awarded for every matched Interaction with the term appearing in secondary content (Articles that are related to the Interaction). Note the number of points awarded for a secondary content match is configurable.
4. The same scoring model as described above for multiple present terms is used in the case of any Article or other content that is related to the Intention being analyzed.

The final tallied score is illustratively referred to as the OrgTermSetDimScore.

The Intention Dimensions score is the sum the following dimensions. This sum is illustratively referred to as OrgIntentionDimSum and illustratively comprises a sum of the following elements:
1. The number of times any user in the organization/control group/segment has taken the same action in this Instance Context multiplied by a configurable weighting of this dimension.
2. The number of times any user in the organization/control group/segment has taken the same action when an Intention is in this state multiplied by a configurable weighting of this dimension.
3. The number of times any user in the organization/control group/segment has taken the same action on an Intention in this community multiplied by a configurable weighting of this dimension.
4. The number of times any user in the organization/control group/segment has taken the same action for any Intention that has any other user defined Intention Dimensions multiplied by a configurable weighting of this dimension.
5. The number of times any user in the organization/control group/segment has taken the same action for any Intention when the sentiment/polarity/-subjectivity is within the same sentiment/polarity/subjectivity range as the current Intention being analyzed multiplied by a configurable weighting of this dimension.

The sum (OrgIntentionDimSum) is divided by the number of Intention Dimensions and a configurable logarithmic function applied to the result to ensure that the resulting score does not dominate other factors being considered. The logarithmic base or other formula used to normalize the score attributed to the Intention Dimensions is configurable. The result of this computation is illustratively referred to as OrgIntentionDimScore.

The Submitter Dimensions measure whether and how the submitter's background, profile and Diversity & Inclusion attributes influence the organization/control group/segment's action taken on the Intention. This is illustratively represented by a sum, referred to as OrgSubmitterDimSum, of the following elements:
1. The number of times any user in the organization/control group/segment has taken the same action on an Intention when the submitter is male (or female, etc.)
2. The number of times any user in the organization/control group/segment has taken the same action on an Intention when the submitter has the same Ethnicity as the participant 3. The number of times any user in the organization/control group/segment has taken the same action on an Intention when the submitter is in the same Department as the participant
4. Any of other diversity and inclusion attributes or user defined fields that are available and are configured to be factored into the calculation.

The sum (OrgSubmitterDimSum) is divided by the number of Submitter Dimensions and a logarithmic base applied to the result to ensure that the resulting score does not dominate other factors being considered. The logarithmic base or formula used to calculate the final score attributed to the Submitter Dimensions is configurable. The result of this calculation is illustratively referred to as OrgSubmitterDimScore.

The action's total score is computed based on a weighted sum of the above defined dimensions as follows:
1. UserSubmitterDimScore multiplied by its configured weighting, plus
2. PeerSubmitterDimScore multiplied by its configured weighting, plus
3. OrgSubmitterDimScore multiplied by its configured weighting The action's total score is recomputed every time there is a change in the state of the Intention, change in a participant's profile, or any other data change that may affect the action's total score. The action's total score is stored in the participant's Action Set.

Any of the above described dimensions, and any sub attributes of these dimensions is assigned a weighting. An administrative user, for example, can adjust such weighting to give more importance to a given attribute or to fully nullify its effect in the action score computation process.

Figure 10:
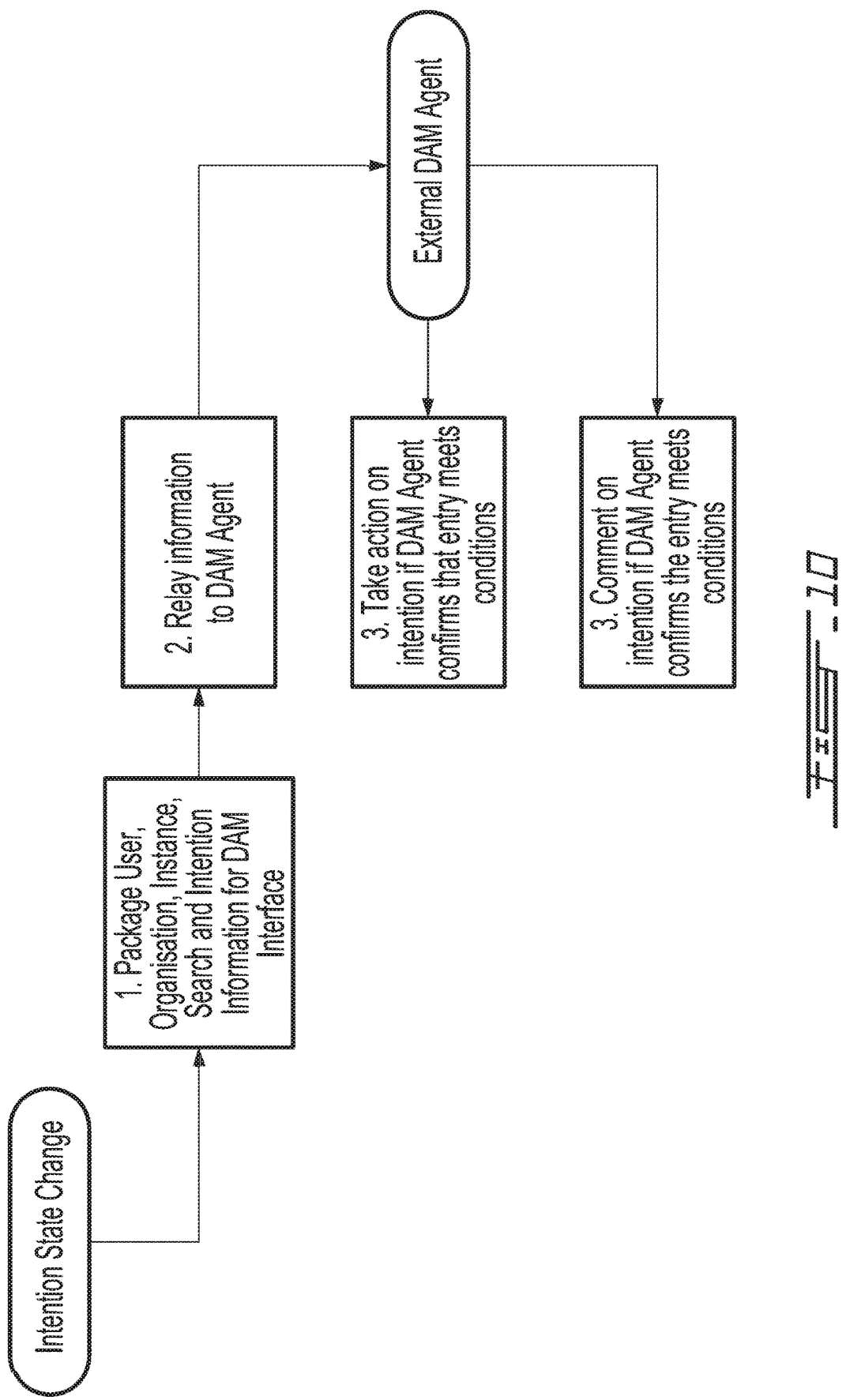
FIG. 10 provides a diagram of an autonomous commenting method in accordance with an illustrative embodiment of the present invention.

Referring now to FIG. 10 in addition to FIG. 2, an autonomous commenting method will now be described. The AIG engine 66 may be configured to automatically comment on an Intention on behalf of a participant 56 or provide recommendations or suggestions to the participant 56 as to the comments to make on an Intention in a given state.

Pre-canned comments can be manually set up and entered, for example by an administrative user, to be used by anyone in the organization, for specific groups or Instance Contexts, specific situations, or for specific participants. Pre-canned comments can also be automatically activated by the system based on past Instance Contexts and participant commenting patterns. Automatic comment rules can be overridden and updated by participants at any time.

The AIG engine auto-commenting function is incorporated in the same process as described above in regards to an action scoring method. The Action Set includes a list of possible pre-canned comments a participant can make for a given Intention in a given state. Every possible pre-canned comment is scored and the results are stored in the Action Set with every change made to the state of the Intention and the participant. The following changes are made to the process described above in regards to the action scoring method to rank comments:
1. Since Comments have a different priority than other actions, comments are not ranked and processed along with other actions. The AIG engine runs a second pass specifically to rank the best comments to make for an Intention in a given state.
2. Comment actions stored in the Action Set can be assigned a different weighting for User, Peer and Organization dimensions than the weightings that are used to score and rank all other actions.

The scoring of the comment related factors determines what pre-canned comments are appropriate at any given time. The AIG engine can auto submit a pre-canned comment on behalf of the participant or present the participant with the top ranked comments they can choose from at any given time.

Users have the option to recall (undo) a pre-canned comment. Illustratively, recalling a comment negatively affects the pre-canned comment's score for the next situation where the same comment may apply.

A participant may tag a comment they make as a pre-canned comment at any time. Any such comments are added to the participant's personal pre-canned comment library and will be scored along with other pre-canned comments for future action analysis. Administrative users can upgrade such participant specific pre-canned comments to apply to a larger participant group such as for all participants in the Instance Context, a line of business or other segments and user groups. Of note is that auto-commenting method can also be configured to suggest the question(s) a participant should ask. The question is then posted on behalf of the participant once the participant confirms which questions should be posted.

The AIG engine constantly updates the comments a participant may make by updating the Action Set scores related to pre-canned comments/questions at any given time based on any changes to the state of the Intention including sentiment analysis as described above. Comments are analyzed and processed independent of the other actions defined in the Action Set.

The AIG system may be configured to use the Dynamic Action Model (DAM) instead of BAM. In this case, the AIG engine delegates the action ranking and selection/recommendation as well the comment automation to an external agent. All the data is passed to the external agent and the external agent provides the decision and selections through provided interfaces and callbacks.

A participant may take a period of time, for example hours, days or weeks, to respond or act on an Intention. In one embodiment, the AIG engine is configured to accelerate an activity by compressing the time it takes to choose an action. In this regard, the AIG engine can be set to compress user reaction time by a percentage, illustratively referred to as ReduceReactTimeByPercentage. In this regard:
1. The AIG engine measures the average time it takes a user to take an action based on recorded Interactions and timestamps.
2. This time is multiplied by ReduceReactTimeByPercentage to compute NextActionDeadlineDateTime
3. If the User has not taken an action by NextActionDeadlineDateTime then:
   a. The AIG engine can be setup to oblige the participant to act in a limited time (example in 2 days) after NextActionDeadlineDateTime has been reached to take an action.
   b. If the participant does not act by the configured deadline, the AIG engine will act on behalf of the participant based on its Action selection methods as discussed above, or the user will be presented with a set of actions to choose from based on the method described above.
   c. Enforce that an action is taken at a preset interval, called PresetReactTime. In this regard the AIG engine will monitor a participant's action for a given Intention and if no action is taken by PresetReactTime it will:

i. provide the participant with a set of recommended actions as defined above and ask the user to choose an action, or
ii. act on behalf of the participant based on its Action selection methods as discussed above.

The AIG engine can also be configured to remove a participant (opt out) from contributing to an Intention or to an Instance Context if that participant does not respond to any actions after several times (the number is configurable).

Although the present invention has been described hereinabove by way of specific embodiments thereof, it can be modified, without departing from the spirit and nature of the subject invention as defined in the appended claims.

We claim:

1. A cloud based system for supporting a plurality of participants in an organisation in autonomous and collaborative authoring using a content retrieved from a plurality of on-line data sources accessible via a network, the system comprising;
    a web portal for providing each of the participants remote access and via which at least one of the participants establishes an organizational context of the organization, at least one instance context and at least one autonomous intention comprising a plurality of articles and via which each of the participants may provide participant input in respect to said at least one autonomous intention wherein each of said organizational context, said instance context and said autonomous intention comprises a term set comprising a plurality of terms and weights;
    an Article and Intention Generation (AIG) engine comprising a term set compiler for deriving an aggregate term set from each of said organizational context term set, said instance context term set and said autonomous intention term set, said aggregate term set comprising a plurality of aggregate terms and corresponding weights, and a query builder for generating at least one query from said plurality of aggregate terms and corresponding weights;
    a content retrieval engine for retrieving the content from the plurality of on-line data sources matching said at least one query wherein said retrieved content is ranked according to a ranking method; and
    a repository for storing the retrieved content and a history of each participant's inputs;
    wherein said AIG engine autonomously takes action by at least one of autonomously voting, autonomously commenting and autonomously taking another defined action for each of the participants, said action determined based on said participant inputs, said history, said organizational context, said instant context and the retrieved content.

2. The system of claim 1, wherein said participant input comprises at least one of a vote, an action, a comment and a recommendation.

3. The system of claim 1, wherein said at least one query comprises at least one search term and content matching said at least one query comprises documents matching said at least one search term according to a term frequency-inverse document frequency (TF-IDF) method.

4. The system of claim 1, wherein said AIG engine transforms content recovered by the search engine into at least one of a new intention and a new article, said new intention and said new article linked to one of a specified instance context and intention.

5. The system of claim 4, wherein said AIG engine transforms content recovered by the search engine into a maximum of a predetermined number of articles over a predetermined time period.

6. The system of claim 4, wherein said AIG engine transforms content recovered by the search engine into a predetermined number of articles over a predetermined time period.

7. The system of claim 4, wherein said AIG engine transforms content recovered by the search engine into a maximum of a predetermined number of intentions over a predetermined time period.

8. The system of claim 4, wherein said AIG engine transforms content recovered by the search engine into a predetermined number of intentions over a predetermined time period.

9. The system of claim 1, wherein said plurality of on-line data sources comprise a plurality of different data types, including as structured data, document data, unstructured data from social networking and unstructured data from conversations.

10. The system of claim 9, wherein said data sources which provide structured data are selected from comprise an RSS news feed, a supply chain management system, a project management system, an issue tracking system, an Enterprise Resource Planning (ERP) system, a Client Relationship Management (CRM) system and a content management system, wherein said data sources which provide document data comprise databases at a patent office such as the United States Patent and Trademark Office (USPTO), the World Intellectual Property Organisation (WIPO), the European Patent Office (EPO) and the Canadian Intellectual Property Office (CIPO) and document storage systems, wherein said data sources which provide unstructured data from social networking comprise feeds from Twitter, feeds from Facebook and feeds from LinkedIn, and wherein said unstructured data from conversations comprises e-mail and chat channels.

11. The system of claim 1, wherein each of said term set comprises at least one key term and associated relevancy weighting.

12. The system of claim 11, wherein each of said term set further comprises at least one equivalent term and associated equivalency rating, each of said at least one equivalent term equivalent to one of said at least one key term.

13. A method for supporting a plurality of participants in an organisation in autonomous and collaborative authoring using a content retrieved from a plurality of on-line data sources accessible via a network, the method comprising;
    each of the participants remote accessing a web portal wherein at least one of the participants establishes an organizational context of the organization, at least one instance context and at least one autonomous intention comprising a plurality of articles;
    each of the participants providing from time to time participant input in respect to said at least one autonomous intention comprising at least one of a vote, an action, a comment, a recommendation or combinations thereof wherein each of said organizational context, said instance context and said autonomous intention comprises a term set comprising a plurality of terms and weights;
    deriving an aggregate term set from each of said organizational context term set, said instance context term set and said autonomous intention term set, said aggregate term set comprising a plurality of aggregate terms and corresponding weights;

generating at least one information stream query from said plurality of aggregate terms and corresponding weights;

retrieving the content from the plurality of on-line data sources matching said at least one information stream query;

storing the retrieved content and a history of each participant's inputs in a repository; and autonomously taking action where a participant has failed to provide participant input by at least one of automatically voting, automatically commenting and autonomously taking another defined action for at least one of the participants, said action determined based on said participant inputs, said history, said organizational context, said instant context and the retrieved content.

14. The method of claim 13, wherein said retrieved content is ranked according to a ranking method.

15. The method of claim 14, wherein said storing the retrieved content comprises storing a subset of said ranked retrieved content in order of rank.

16. The method of claim 13, further comprising, in response to a change in an intention, creating a snapshot of said intention comprising a snapshot date and said change in an intention, and storing said snapshot in said repository.

17. The method of claim 16, wherein said change in an intention comprises at least one of editing an intention content, adding an article to an intention, removing an article from an intention, changing an intention owner, changing an intention collaborator, changing an intention participant and changing an intention state.

18. The method of claim 13, wherein said autonomously commenting comprises providing a plurality of pre-canned comments and selecting one of said pre-canned comments, wherein said selecting one of said pre-canned comments comprises presenting a list of said pre-canned comments to a participant, and wherein said providing a plurality of pre-canned comments comprises tagging a previously made comment as pre-canned.

19. The method of claim 13, wherein a participant has failed to provide participant input after an action deadline has expired.

20. The method of claim 19, wherein said action deadline is calculated as an average time a participant takes to provide participant input.

* * * * *